United States Patent [19]
Hashizume et al.

[11] Patent Number: 5,862,446
[45] Date of Patent: Jan. 19, 1999

[54] DRIVE SWITCHING MECHANISM FOR USE IN IMAGE INPUT APPARATUS

[75] Inventors: Masahiro Hashizume; Atsushi Yoshihara; Masami Shibahara, all of Osaka, Japan

[73] Assignee: Mita Industrial Co., Ltd., Osaka-fu, Japan

[21] Appl. No.: 947,238

[22] Filed: Oct. 8, 1997

[30] Foreign Application Priority Data

Oct. 15, 1996 [JP] Japan .................................. 8-272581

[51] Int. Cl.$^6$ .................................................. G03G 15/00
[52] U.S. Cl. ........................................... 399/367; 399/379
[58] Field of Search ................................... 399/361, 365, 399/367, 368, 369, 370, 371, 372, 373, 374, 377, 379; 358/474, 494, 496, 497

[56] References Cited

U.S. PATENT DOCUMENTS

5,233,389  8/1993  Deguchi et al. .................... 399/379 X

*Primary Examiner*—Arthur T. Grimley
*Assistant Examiner*—Hoan Tran
*Attorney, Agent, or Firm*—Jordan and Hamburg LLP

[57] ABSTRACT

This invention relates to a drive switching mechanism for use in an image input apparatus. While a pivotable gear is set on the side of a document feeder, a displacement restricting mechanism of the drive switching mechanism restricts a displacement of the pivotable gear toward an image scanner. With this arrangement, even if the pivotable gear is caused to move toward the image scanner while set on the side of the document feeder, a stopper of the displacement restricting mechanism restricts such movement to maintain an engaged state of the pivotable gear with a drive gear of the document feeder. Accordingly, a driving force of a motor rotatable in the opposite direction (forward and backward) can securely be transmitted to the drive gear of the document feeder via a non-pivotable gear and the pivotable gear. The same operation and effect as on the side of the document feeder is obtainable on the side of the image scanner.

20 Claims, 9 Drawing Sheets

DRIVE SWITCHING MECHANISM FOR USE IN IMAGE INPUT APPARATUS

BACKGROUND OF THE INVENTION

1. Field of the Invention

This invention relates to a drive switching mechanism for use in an image input apparatus capable of selectively performing feed/read operation in which an image of an original document is read by feeding the document and scan/read operation in which an image of an original document is read by relatively scanning the document set in a stationary state by switchingly transmitting a driving force of a motor rotatable in forward and backward directions.

2. Description of the Background Art

Conventionally, there have been provided image input apparatuses capable of reading an image of an original document placed on a flat document platen and an image of an original document fed by an automatic document feeder. The image input apparatus is operated such that an image scanner reads the image of the document set in a stationary state on the document platen while moving relative to the document when the document is set on the document platen. On the other hand, when the image is to be read by the automatic document feeder, the image input apparatus is operated such that the image scanner is moved to a predetermined position for image scanning and pauses thereat, and then the automatic document feeder feeds the original documents successively to the image scanner for reading the image of the original documents successively.

Hereinafter, for sake of easier explanation, the operation in which an image of an original document is read by moving the image scanner relative to the original document set in a stationary state is referred to as "scan/read" operation, while the operation in which an image of an original document is read by feeding the original document while setting the image scanner at the scan position is referred to as "feed/read" operation.

Generally, the scan/read operation and the feed/read operation are not performed simultaneously. In performing the scan/read operation, driving of the automatic document feeder is suspended. Conversely, in performing the feed/read operation, driving of the image scanner is suspended since the image scanner halts at the predetermined scan position. Accordingly, a single motor can be utilized as a common drive source for the image scanner and the document feeder. In view of the above, a drive switching mechanism 4' of prior art shown in FIG. 8 is incorporated in the image input apparatus to selectively transmit a driving force of a motor to the image scanner and to the automatic document feeder.

Figure 8:
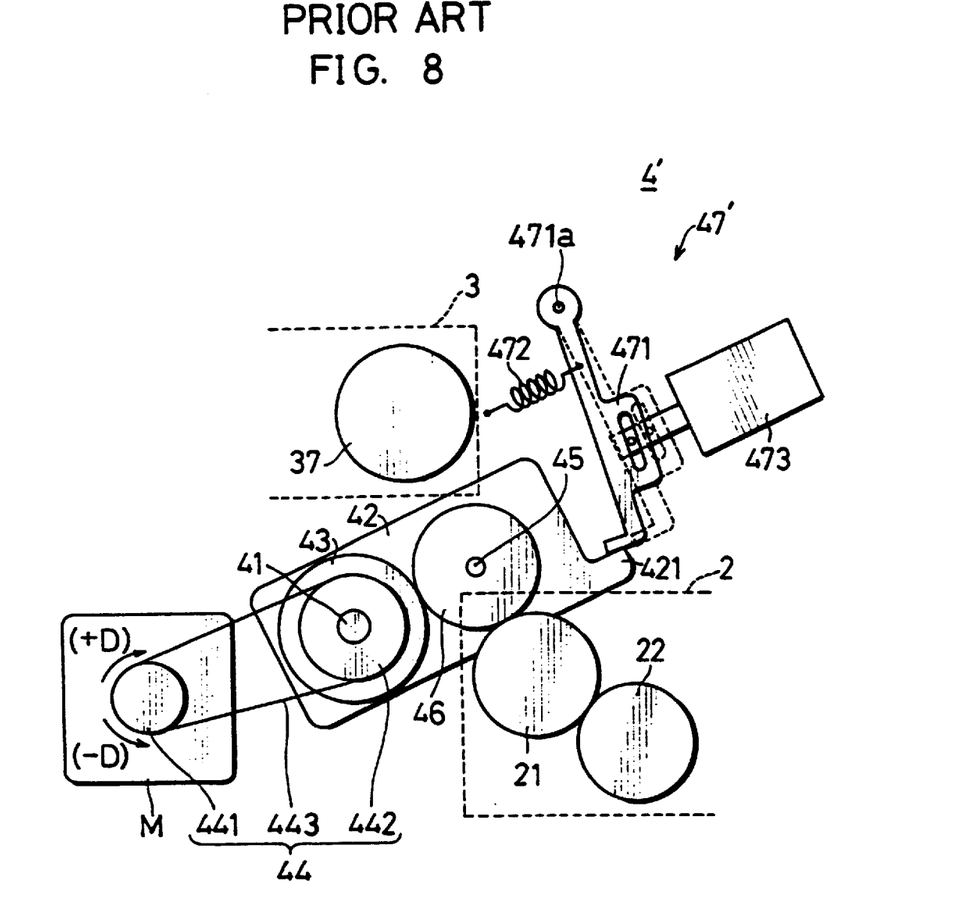
FIG. 8 is a diagram showing a drive switching mechanism of prior art.

Referring to FIG. 8, the drive switching mechanism 4' is adapted for selectively transmitting a driving force of a motor M to a drive gear 21 provided in an image scanner 2 and to a drive gear 37 provided in an automatic document feeder 3 to transmit the driving force to the designated one.

The drive switching mechanism 4' has a link plate 42 pivotally movable between the image scanner 2 and the automatic document feeder 3 about an axis 41 which is located near the motor M. A non-pivotable rear 43 rotatably mounted on the link plate 42 via a shaft (or axis) 41 provided on the link plate 42. The non-pivotable gear 43 is constructed to receive a driving force of the motor M via a drive transmission mechanism 44.

A pivotable gear 46, which is rotatably mounted on the link plate 42 via a shaft (or axis) 45, is in an engaged state with the non-pivotable 43. The pivotable gear 46 is set to be pivotally movable together with the link plate 42 between the image scanner 2 and the automatic document feeder 3 in correspondence to a pivotal movement of the link plate 42 that follows the rotational direction of the motor M.

As shown in FIG. 8, when the link plate 42 is set on the side of the image scanner 2, the pivotable gear 46 is meshed with the drive gear 21 of the image scanner 2. Consequently, the driving force of the motor M is transmitted to the drive gear 21 via the drive transmission mechanism 44, the non-pivotable gear 43, and the pivotable gear 46. Then, the driving force transmitted to the drive gear 21 is transmitted to the image scanner 2 via a gear 22 that is meshed with the drive gear 21 to perform a scan/read operation.

Note that the motor is rotatable in two directions, forward and backward directions. Throughout the description, the force to rotate the motor M in the forward direction is denoted by the arrow of (+D), while the force to rotate the motor M in the backward direction is denoted by the arrow of (−D). When the motor is rotated in (+D) direction, the pivotable gear 46 receives a driving force to move the pivotable gear 46 (and the link plate 42) toward the image scanner 2. Thus, an engaging state of the pivotable gear 46 with the drive gear 21 is maintained.

On the contrary, when the rotating direction is reversed to (−D), the pivotable gear 46 receives a driving force to move the pivotable gear 46 (and the link plate 42) toward the automatic document feeder 3. Accordingly, the pivotable gear 46 tries to move away from the image scanner 2. To restrict such movement of the pivotable gear 46 (and the link plate 42), there is provided a displacement restricting mechanism 47' for restricting a displacement of the pivotable gear 46 toward the document feeder 3.

The displacement restricting mechanism 47' has a stopper 471 pivotally movable about a pivot member 471a provided at one end thereof, a spring 472 for urging the stopper 471 toward a restrict position (shown by solid line in FIG. 8), and a solenoid 473 for pivotally moving the stopper 471 between the restrict position and a release position (shown by dashed line in FIG. 8). According to this arrangement, when it is required to move the pivotable gear 46 between the image scanner 2 and the automatic document feeder 3, the solenoid 473 is turned to an ON-state to set the stopper 471 to the release position, i. e., to release the stopper 471 from an engaged state with the link plate 42. After the pivotable gear 46 is moved on the side of the image scanner 2 or on the side of the automatic document feeder 3, the solenoid 473 is turned to an OFF-state to return the stopper 471 to the restrict position.

As shown in FIG. 8, after the pivotable gear 46 is moved on the side of the image scanner 2 and engaged with the drive gear 21, the stopper 471 is returned to the restrict position. Accordingly, even if the rotational direction of the motor M is switched to (−D) direction, and a driving force to move the pivotable gear 46 toward the automatic document feeder 3 is acted upon the pivotable gear 46 (and the link plate 42), a projection 421 formed on the opposite end of the link plate 42 is abutted against a lead end (contact portion) of the stopper 471 to restrict the movement (displacement) of the pivotable gear 46 toward the document feeder 3. Thus, the driving forces represented by (+D) and (−D) are selectively transmitted to the image scanner 2.

Figure 9:
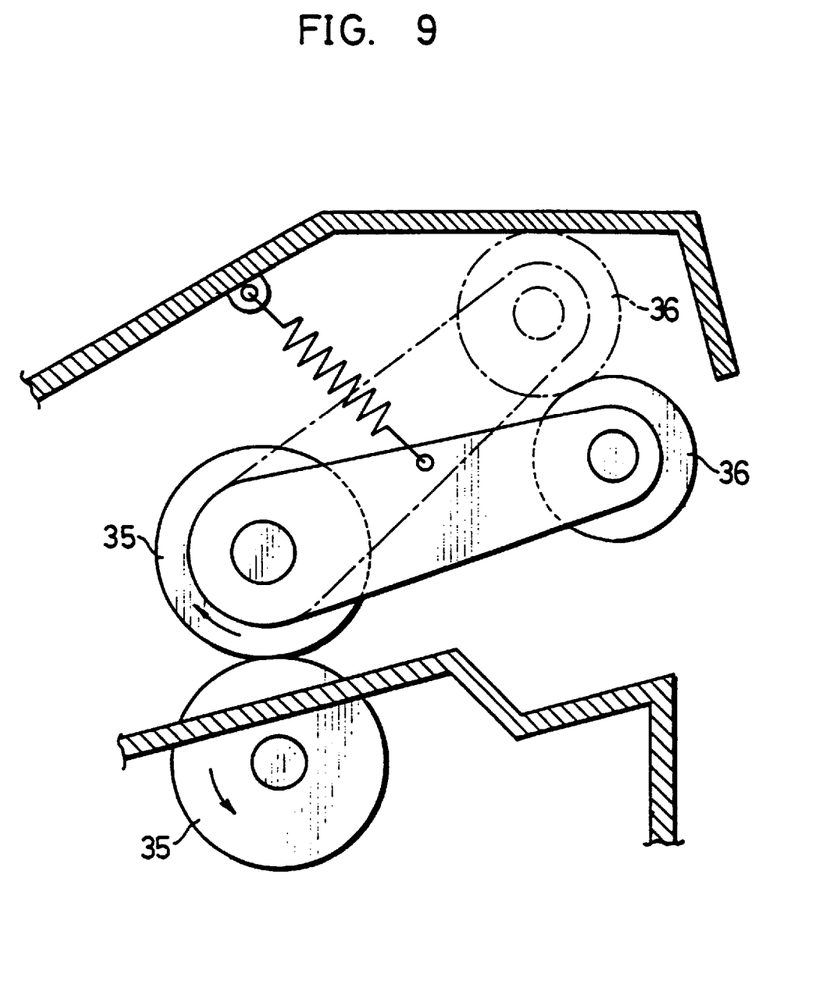
FIG. 9 is a diagram showing a construction of a document feeder to successively feed original documents from the uppermost one.

Referring to the automatic document feeder 3, it is commonly the case that a pair of separation rollers 35 and 35 are provided in the automatic document feeder 3, as shown in FIG. 9. The automatic document feeder 3 is designed to receive the driving force acting in (−D) direction from the motor M. Upon receiving this force, the separation rollers 35 and 35 are rotated in the direction of arrow in FIG. 9 to feed original documents. Since there is no need of feeding the original documents in the direction opposite to the document feed direction, there was no need of transmitting the driving force (+D) to the automatic document feeder 3. Accordingly, the conventional drive switching mechanism 4' had no motivation to provide a restricting mechanism of restricting a displacement of the pivotable gear 46 toward the image scanner 2 when the pivotable gear 46 is set on the side of the document feeder 3 and the driving force (+D) is transmitted to the document feeder 3.

However, as shown in FIG. 9, in the case where original documents are to be successively fed from the uppermost stacked one, it is required to provide a sub roller 36 on the upstream side of the separation rollers 35 and 35 with respect to the document feed direction. The sub roller 36 is designed to pivotally move upward and downward in the following manner. The sub roller 36 needs to be located on the upper position (phantom line in FIG. 9) so as not to interfere insertion of original documents before feeding of the uppermost original document is initiated. In feeding the original documents, on the contrary, the sub roller 36 needs to be lowered to come into contact with the uppermost original document to forward the original document toward the separation rollers 35 and 35. Since the arrangement of pivotally moving the sub roller 36 is similar to the arrangement of pivotally moving the link plate 42, the description thereof is omitted herein.

If the drive transmission mechanism in the document feeder 3 were designed to receive the driving force of (+D) as well as (−D), the sub roller 36 could have been pivotally moved up and down with a simplified construction because it could receive driving forces acting in the opposite direction. However, as mentioned above, the conventional drive switching mechanism 4' had no motivation of transmitting a driving force of (+D) to the document feeder 3, and hence a displacement restricting mechanism was not provided on the side of the document feeder 3. Accordingly, in the prior art technology, a complicated construction to pivotally move the sub roller 36 up and down has been required, which reflects on production cost of the drive switching mechanism.

SUMMARY OF THE INVENTION

In view of the above, it is an object of this invention to provide a drive switching mechanism for use in an image input apparatus which enables selective transmission of driving force of a motor rotatable in forward and backward directions to a document feeder and to an image scanner.

The drive switching mechanism of this invention is used in an image input apparatus having a motor rotatable in a forward direction and a reverse direction, a document feeder for feeding an original document upon receiving a driving force of the motor, and an image scanner for scanning an image of the original document upon receiving the driving force of the motor to selectively switch a transmission of the driving force of the motor to the document feeder and to the image scanner. To accomplish the above object, the drive switching mechanism comprises: link means pivotally provided about a first axis provided on one side thereof; first drive transmission means rotatably mounted on the link means via the first axis upon receiving the driving force of the motor; second drive transmission means rotatably mounted on the other side of the link means via a second axis in association with the rotation of the first drive transmission means; load supplier means interposed between the second drive transmission means and the link means for exerting a resistance between the link means and the second drive transmission means to swing the link means together with the second drive transmission means around the first axis in a direction following the rotation of the motor; and displacement restricting means for restricting the displacement of the second drive transmission means toward the image scanner during supply of the driving force of the motor to the document feeder via the first drive transmission means and the second drive transmission means when the second drive transmission means is set on the side of the document feeder, and for restricting the displacement of the second drive transmission means toward the document feeder during supply of the driving force of the motor to the image scanner via the first drive transmission means and the second drive transmission means when the second drive transmission means is set on the side of the image scanner.

The above and other objects, features and advantages of the present invention will become more apparent upon a reading of the following detailed description and drawings.

DETAILED DESCRIPTION OF THE PREFERRED EMBODIMENTS OF THE INVENTION

Figure 1:
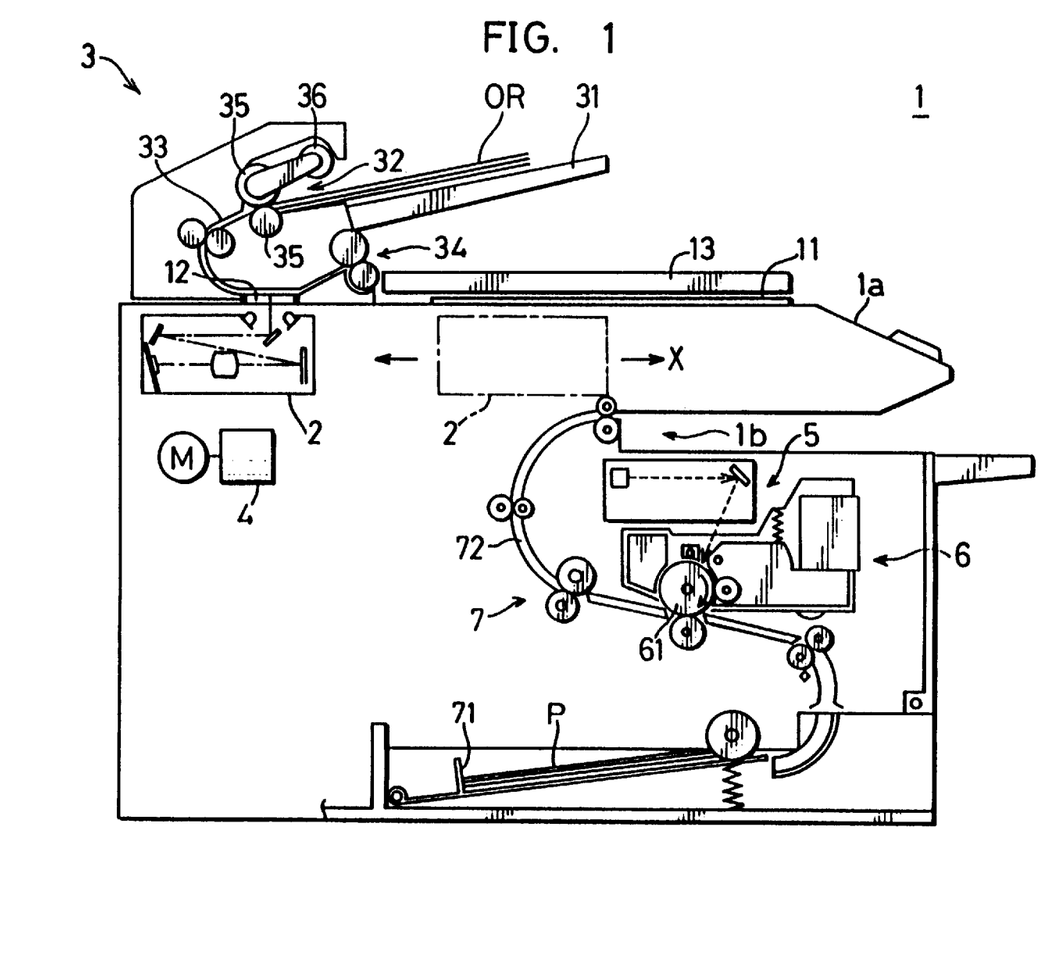
FIG. 1 is a diagram exemplifying an image forming apparatus incorporated with a drive switching mechanism according to this invention.

FIG. 1 is a diagram exemplifying an image forming apparatus to which a drive switching mechanism according to this invention is applicable. The image forming apparatus 1 is a complex machine having a combined function as image input apparatus for reading an image of an original document, as copying machine for copying the read image on a copy sheet, and as facsimile machine. At the top of an image forming apparatus main body 1a there are mounted contact glasses 11 and 12. The contact glass 11 has a relatively large size, and a document presser 13 is disposed above the contact glass 11 to cover an entire plane of the contact glass 11 when closed.

When an original document is set on the contact glass 11, the document presser 13 is set to a closed state to cover the entire plane of the contact glass 11, and the image scanner 2 reciprocates in the direction of arrow X in FIG. 1, then, the image of the original document set in a stationary state on the contact glass 11 is scanned.

The contact glass 12 has a relatively small size compared to the contact glass 11, and the automatic document feeder 3 is disposed above the contact glass 12. The automatic document feeder 3 is constructed such that when an original document OR is fed in a state that the image scanner 2 is positioned at a fixed scan position just below the contact glass 12 as shown by solid line in FIG. 1, the image of the original document OR is read by the image scanner 2.

More specifically, the original document OR set on a document table 31 is fed along a substantially C-shaped document transport path 33 through an inlet 32 opened rightward on the plane of FIG. 1 for image scanning, and is discharged through an outlet 34 opened in the same direction as the inlet 32 after the image scanning. The outlet 34 is provided underneath the document table 31.

Besides a pair of separation rollers 35 and 35, a sub roller 36 is arranged near the inlet 32 to securely feed the original document OR. As mentioned above, the sub roller 36 is pivotally movable up and down to be retracted (raised) above the original document OR as shown in FIG. 1 so as not to interfere insertion of the original document OR, and to be lowered to come into contact with the original document OR to feed the original document OR toward the separation rollers 35 and 35.

A single motor M is a drive source for the image scanner 2 and the automatic document feeder 3. The motor M is designed such that a rotational driving force of the motor M is selectively transmitted to the image scanner 2 and to the automatic document feeder 3 via a drive switching mechanism 4 which is described later in detail.

The apparatus main body 1a has an optical unit 5, an imaging assembly 6 with a photoreceptor 61, a transport mechanism 7 for transporting a copy sheet P accommodated in a paper cassette 71 along a substantially S-shaped transport path 72. Also, the apparatus main body 1a is constructed to record on a copy sheet P an original image which has been read by the image scanner 2 in the above manner or an original image which has been transmitted from an externally provided facsimile machine via a telephone line, and to discharge the copy sheet P with the recorded image thereon outside the apparatus main body 1a through a discharge outlet 1b.

Figure 2:
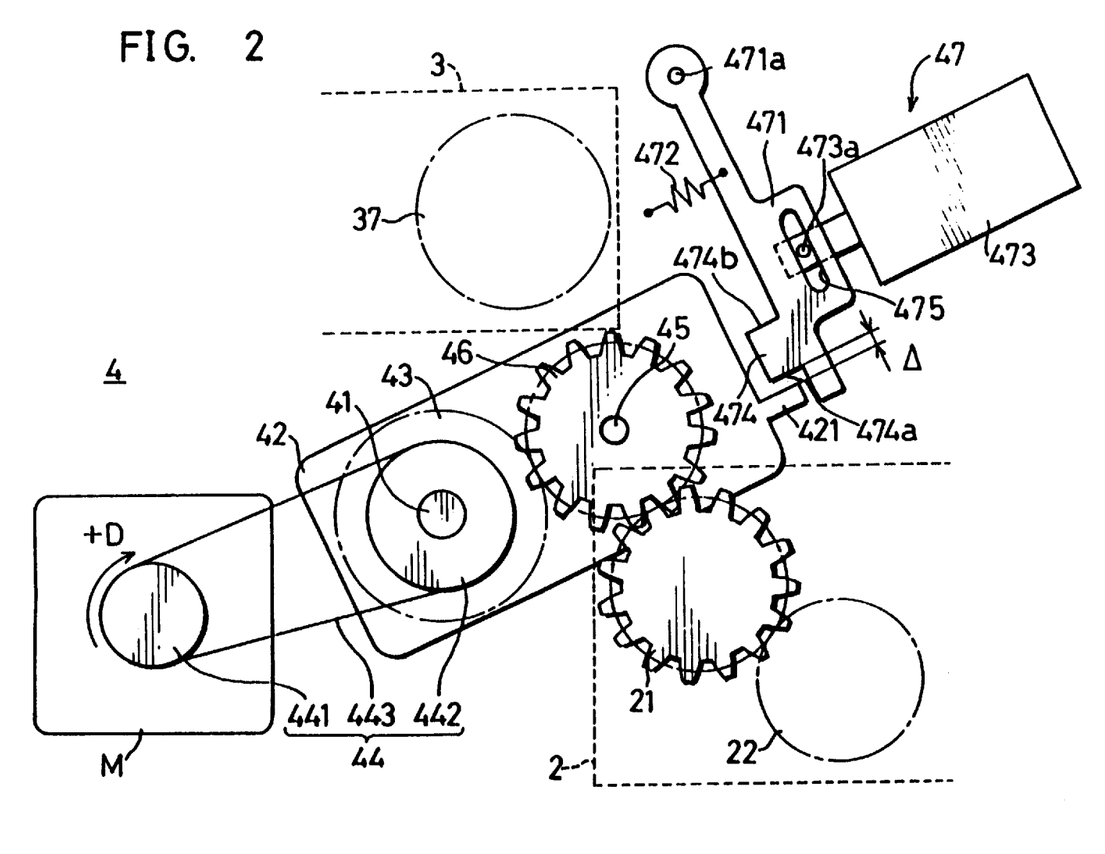
FIG. 2 is a diagram of an embodiment of the drive switching mechanism.
Figure 3:
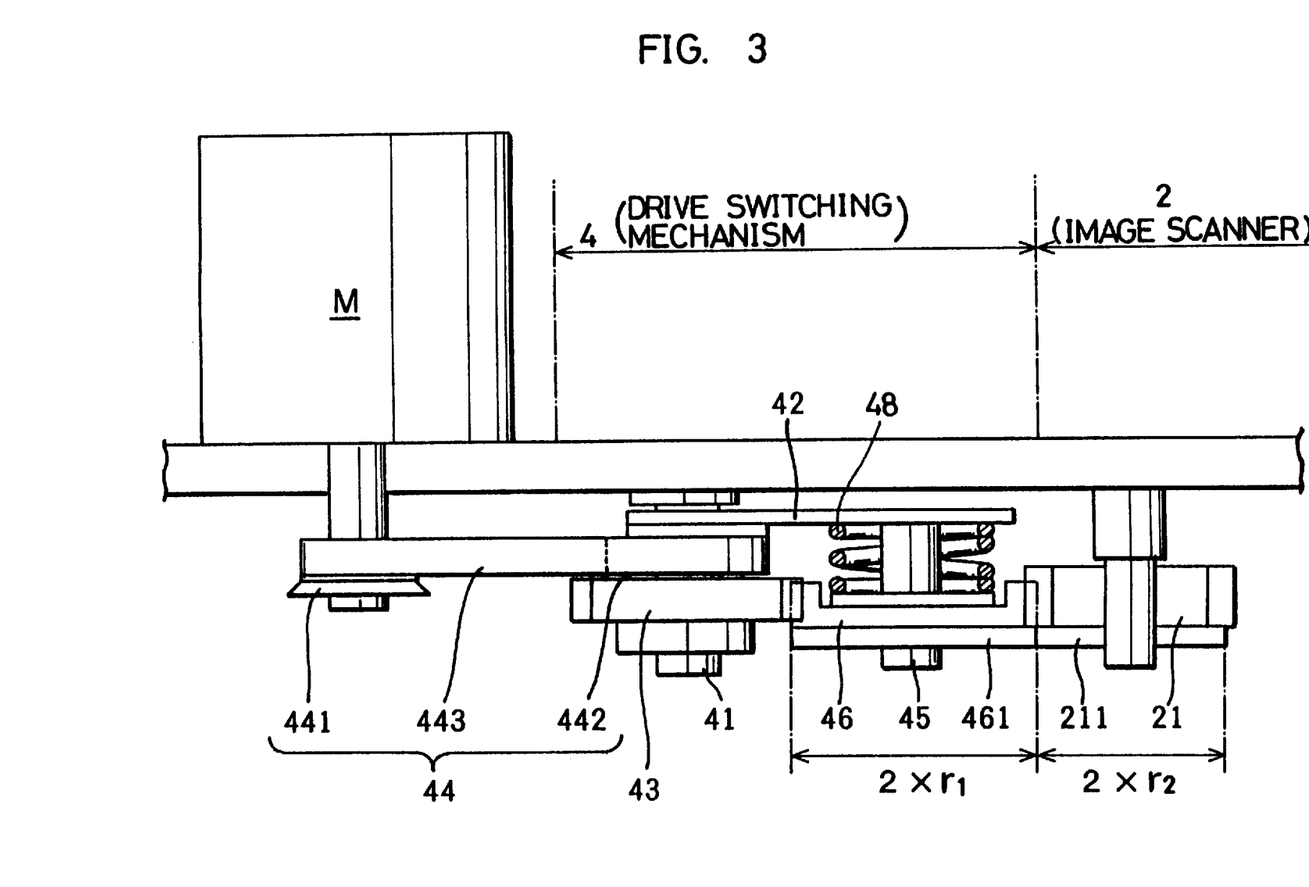
FIG. 3 is a diagram illustrating a state where a non-pivotable gear, a pivotable gear, and a drive gear are meshed with one another in the drive switching mechanism.

FIG. 2 is a diagram showing an embodiment of the drive switching mechanism according to this invention. In the drawing, a circle indicated by dash and single dotted line in the drawings of FIGS. 5 to 7 indicates a pitch circle of each gear. FIG. 3 is a diagram showing a state where a non-pivotable gear (hereinafter simply referred to as NP-Gear) 43, a pivotable gear (hereinafter simply referred to as P-Gear) 46 and a drive gear 21 are meshed with one another. Where the term "pivotable" used in this context for the P-Gear 46 is meant to be an ability of pivotal movement of the gear around the shaft (axis) 41. Likewise, the negative form "non-pivotable" in this context is to mean an inability of pivotable movement of the gear around the shaft (axis) 41. The drive switching mechanism 4 is a driving force transmission device for selectively transmitting the driving force of the motor M to the drive gear 21 provided in the image scanner 2 and to a drive gear 37 provided in the automatic document feeder 3, and is constructed as follows.

The drive switching mechanism 4 has a link plate 42 pivotally supported on a shaft (first axis) 41 which is provided on one side of the link plate 42, near the motor M. Specifically, the link plate 42 is pivotally movable about the axis 41. The NP-Gear 43 is rotatably mounted on the link plate 42 via the shaft 41. The NP-Gear 43 is rotated upon receiving a driving force of the motor M via a drive transmission mechanism 44 comprising a pulley 441 mounted on the motor M, a pulley 442 mounted on the shaft 41, and a belt 443 wound around the pulleys 441 and 442.

The P-Gear 46 is rotatably mounted on the link plate 42 about a shaft (second axis) 45 provided on the other side of the link plate 42. The P-Gear 46 is engaged with the NP-Gear 43 to thereby be rotatable in association with a rotation of the NP-Gear 43.

As shown in FIG. 3, a spring 48 functioning as load supplier means is interposed between the P-Gear 46 and the link plate 42. A bias force of the spring 48 enables the link plate 42 to pivotally move about the shaft (axis) 41 following the rotational direction of the motor M.

For instance, as shown in FIG. 2, when the motor M is driven in (+D) direction, the NP-Gear 43 and the P-Gear 46 are rotated in a specified direction on the link plate 42. The link plate 42 is pivotally moved toward the image scanner 2 following the rotation of the motor M in (+D) direction, and the P-Gear 46 mounted on the link plate 42 is moved toward the image scanner 2 together with the pivotal movement of the link plate 42. Thereby, the P-Gear 46 is engaged with the drive gear 21 of the image scanner 2. It should be noted that in this embodiment the spring 48 is used as a resistance force supplying means (or referred to as load supplier means). Alternatively, an elastic member made of a rubber material may be used in place of spring.

The P-Gear 46 and the drive gear 21 which are meshed with each other are respectively mounted with rollers 461 and 211 which have a pitch circle indicated in the drawing in FIG. 3. When the P-Gear 46 is moved toward the image scanner 2, the rollers 461 and 211 come into contact with each other and are meshed with each other. The symbols r1 and r2 in FIG. 3 respectively denote the radius of pitch circle of the P-Gear 46 and the drive gear 21.

In FIG. 2, the reference numeral 47 denotes a displacement restricting mechanism. The displacement restricting mechanism 47 has a stopper 471 pivotally movable about a pivot point 471a provided at one end thereof, a spring 472 for urging the stopper 471 toward a restrict position (shown by solid line in FIG. 2), and a solenoid 473 for switching the stopper 471 between the restrict position and a release position (shown by solid line in FIG. 6). The restrict position and the release position are described later in detail.

A projection (engaging portion) 474 protruding toward the link plate 42 is formed at the opposite end of the stopper 471. The projection 474 has a side portion 474a and a side portion 474b. The side portion 474a is formed on the side of the image scanner 2 and is engageable with a projection 421 of the link plate 42 when the link plate 42 is set to enable a scan/read operation. The side portion 474b is formed on the side of the automatic document feeder 3 and is engageable with the projection 421 of the link plate 42 when the link plate 42 is set to enable a feed/read operation. The projection 421 is formed on the side of the link plate 42 where the P-Gear 46 is mounted.

The stopper 471 is formed with an elongated hole (slit) 475 substantially in the middle thereof. An engaging member (e.g., projection) 473a mounted at the lead end of the solenoid 473 is slidable along the longitudinal direction of the slit 475. With this arrangement, in response to an ON/OFF state of the solenoid 473, the engaging member 473a is moved along the slit 475 to pivotally move the stopper 471 between the restrict position and the release position about the pivot point 471a.

Figure 4:
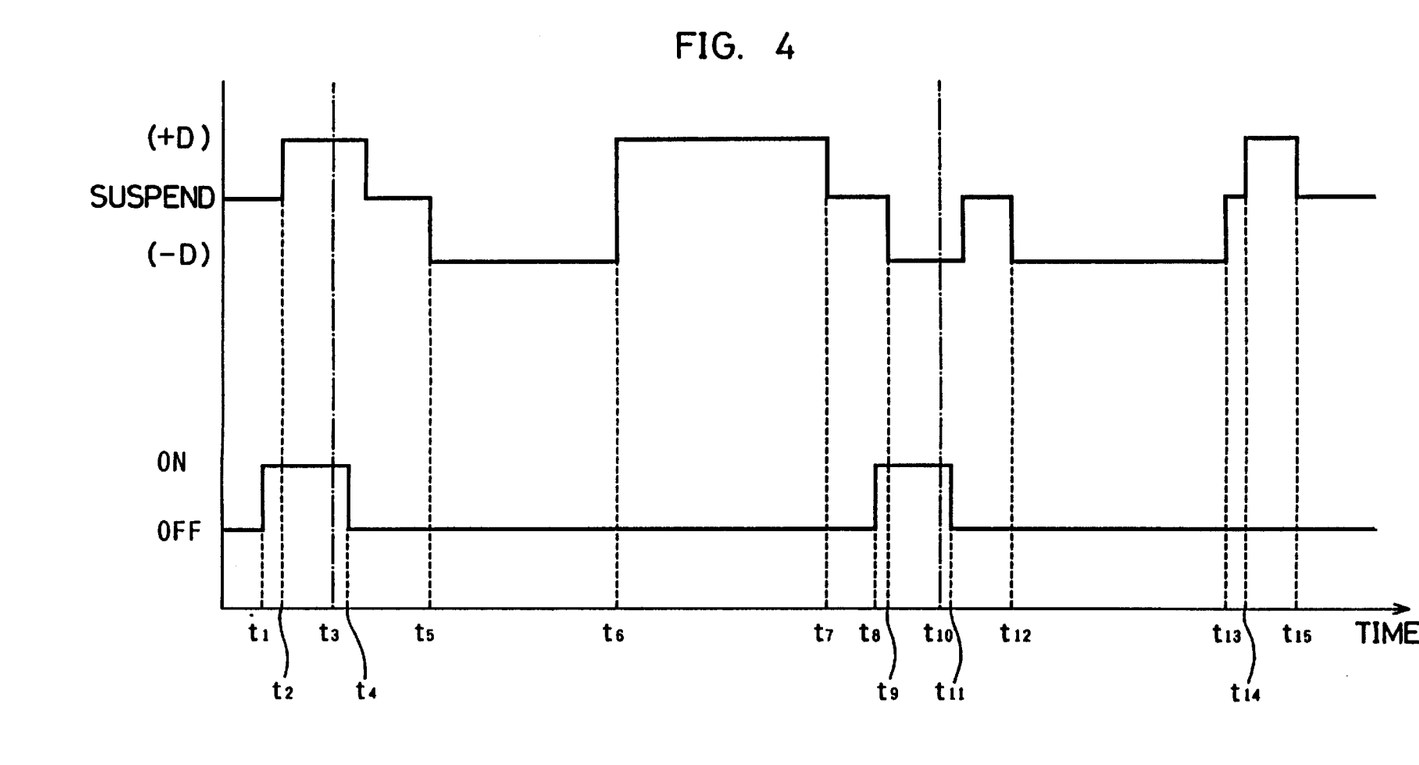
FIG. 4 is a timing chart showing operations of the drive switching mechanism.

Next, an operation of the drive switching mechanism 4 having the above construction is described in detail with reference to FIGS. 2, 4 to 7. FIG. 4 is a timing chart showing how the drive switching mechanism 4 is operated in accordance with an ON/OFF operation of the solenoid 473. In the vertical axis in FIG. 4, "(+D)" represents an operation of rotating the motor M in the direction (+D);

"SUSPEND" represents a state where the driving of motor M is suspended;

"(−D)" represents an operation of rotating the motor M in the direction (−D);

"ON" represents that the solenoid 473 is turned to an ON-state (see FIG. 6); and "OFF" represents that the solenoid 473 is turned to an OFF-state (see FIG. 2).

In the horizontal axis in FIG. 4, "TIME" represents time elapsed.

Figure 6:
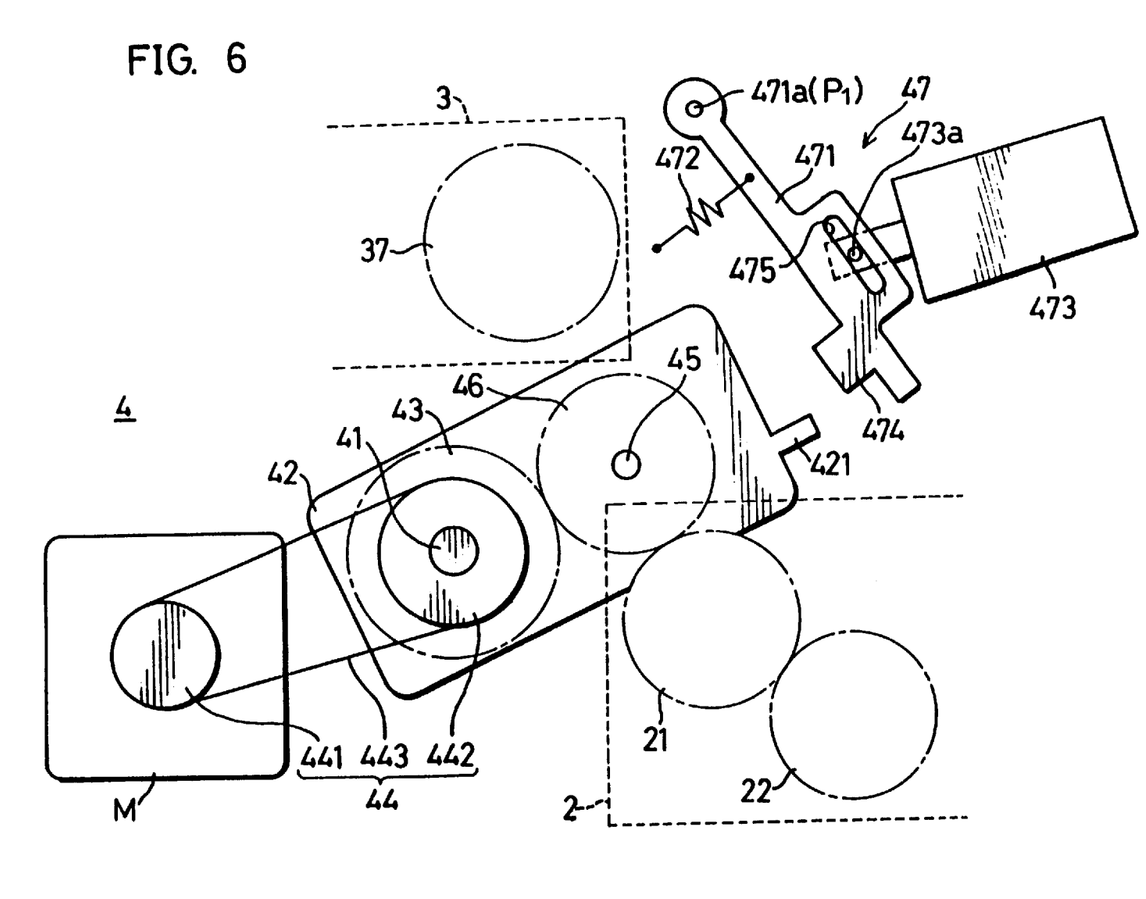
FIG. 6 is a diagram showing an operation of the drive switching mechanism in FIG. 2.

First, at the timing t1, the solenoid 473 is turned to an ON-state. Then, the stopper 471 is moved to the release position to render the projection 474 of the stopper 471 disengaged from the projection 421 of the link plate 42, as shown in FIG. 6. Thereby, an engaging state of the P-Gear 46 with the drive gear is released, and the link plate 42 is set movable toward the image scanner 2 or toward the document feeder 3 following the rotation of the motor M, as will be described later. During the period from t1 to t4, the solenoid 473 is in the ON-state to keep the stopper 471 at the release position. At the timing t2, the motor M is driven to rotate in the (+D) direction. Then, upon receiving the driving force of the motor M, the link plate 42 is moved toward the image scanner 2, and hence moving the P-Gear 46 toward the image scanner 2. Thereby, the P-Gear 46 is engaged with the drive gear 21 of the image scanner 2 at the timing t3.

Upon completion of the movement of the P-Gear 46 toward the image scanner 2, the solenoid 473 is turned to an OFF-state at the timing t4, and accordingly, the projection 474 of the stopper 471 is returned to the restrict position (toward the link plate 42) as shown in FIG. 2. In this embodiment, the restrict position of the stopper 471 is set such that there is defined a clearance Δ between the projection 474 of the stopper 471 and the projection 421 of the link plate 42 when the stopper 471 is moved to the restrict position. Accordingly, even if the ideal engagement state of the P-Gear 46 with the drive gear 21 is lost during the rotation of the P-Gear 46 and the drive gear 21 due to an abrupt torque transmission between these two gears, the stopper 471 can reliably position the link plate 42 at the restrict position to maintain the engaged state of the two gears (P-Gear 46 and drive gear 21) as far as the displaced amount of the link plate 42 is kept in the clearance Δ.

Upon completion of the positioning of the stopper 471 at the restrict position, driving of the motor M is temporarily suspended. Thereafter, during the period from t5 to t6, the motor M is rotated in the (−D) direction to return the image scanner 2 to the home position. At this time, the driving force to rotate the motor M in the (−D) direction causes the P-Gear 46 (and the link plate 42) to move toward the document feeder 3. However, since the stopper 471 is set to the restrict position as mentioned above, the stopper 421 of the link plate 42 is abutted against the projection 474 of the stopper 471 (FIG. 5) when the link plate 42 is being moved toward the document feeder 3. Accordingly, a movement of the link plate 42 toward the document feeder 3 beyond the engaging state is restricted.

Figure 5:
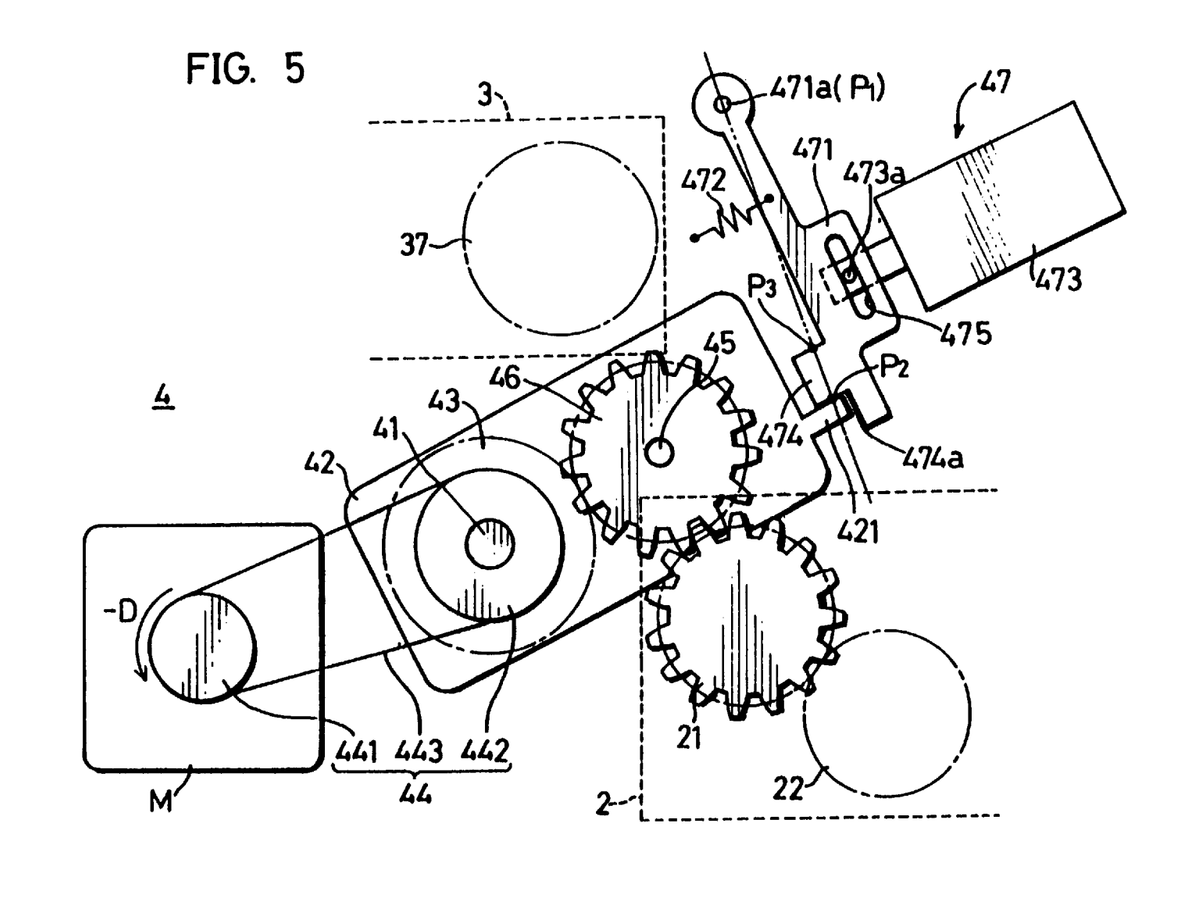
FIG. 5 is a diagram showing an operation of the drive switching mechanism in FIG. 2.

The clearance Δ is set to a value in a range so as to maintain the engaging state of the P-Gear 46 with the drive gear 21 even if the P-Gear 46 is most displaced toward the document feeder 3 within the range. Accordingly, even if the P-Gear 46 is caused to move toward the document feeder 3 by its maximum possible amount, the engaging state of the P-Gear 46 with the drive gear 21 is maintained to thereby transmit the driving force of the motor M to the image scanner 2 via the P-Gear 46.

Next, at the timing t6, the rotational direction of the motor M is changed from (−D) to (+D), and a driving force of the motor in the (+D) direction is transmitted to the image scanner 2 until the timing t7 to enable a scan/read operation. Then, at the timing t7 when the scan/read operation is completed, as shown in FIG. 2, the projection 421 of the link plate 42 is set apart from the projection 474 of the stopper 471 the clearance Δ. Then, at the timing t8, the solenoid 473 is turned to an ON-state to move the stopper 471 to the release position. Thereby, the projection 474 of the stopper 471 disengages from the projection 421 of the link plate 42. At this time, since the clearance Δ (FIG. 2) is defined between the projection 474 of the stopper 471 and the projection 421 of the link plate 42, no external force is exerted on the projection 474 of the stopper 471 when the stopper 471 is disengaged from the link plate 42 and set to the release position. Thereby, the stopper 471 can be pivotally moved smoothly between the release position and the restrict position.

As shown in FIG. 6, following the pivotal movement of the stopper 471 to the release position, the motor M is driven in (−D) direction at the timing t9. Then, upon receiving a driving force of the motor M in the (−D) direction, the link plate 42 is moved toward the document feeder 3. Consequently, the P-Gear 46 is moved toward the document feeder 3 to engage with the drive gear 37 of the document feeder 3 at the timing t10.

Figure 7:
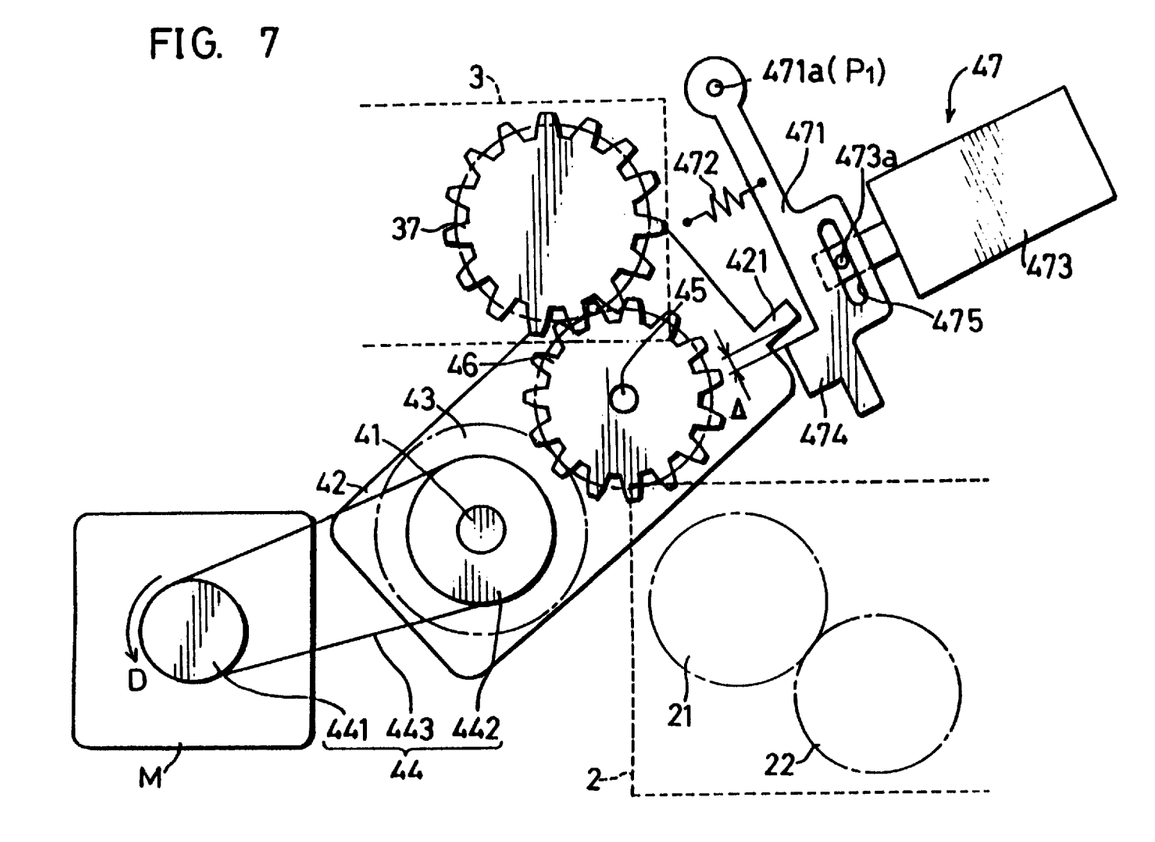
FIG. 7 is a diagram showing an operation of the drive switching mechanism in FIG. 2.

Upon completion of the pivotal movement of the P-Gear 46 toward the document feeder 3, the solenoid 473 is turned to an OFF-state at the timing t11, and the stopper 471 is returned to the restrict position relative to the link plate 42, as shown in FIG. 7. At this time, similar to the restrict state in FIG. 2, the restrict position of the stopper 471 is set such that there is defined the clearance Δ between the projection 474 of the stopper 471 and the projection 421 of the link plate 42. Accordingly, even if the ideal engagement state of the P-Gear 46 with the drive gear 37 is lost during the rotation of the P-Gear 46 and the drive gear 37 due to an abrupt torque transmission between the two gears (P-Gear 46 and drive gear 37), the stopper 471 can reliably position the link plate 42 at the restrict position to maintain the engaged state of the two gears (P-Gear 46 and drive gear 37) as far as the displaced amount of the link plate 42 is kept within the clearance Δ.

Upon completion of the positioning of the stopper 471 at the restrict position, driving of the motor M is temporarily suspended, and then the motor M is rotated in (−D) direction to feed original documents during the period from t12 to t13. Upon completion of feeding the original documents at the timing t14, driving of the motor M is temporarily suspended, and then the motor M is rotated in the (+D) direction to lift the sub roller 36 upward to enable insertion of a next set of original documents during the period from t14 to t15.

As mentioned above, the driving force of the motor M in the (+D) and (−D) directions is selectively transmitted to the image scanner 2 and to the document feeder 3 via the drive transmission mechanism 44, the NP-Gear 43 and the P-Gear 46, according to needs by the operations mentioned above.

According to the drive switching mechanism 4 of this invention, as mentioned above, the driving force of the motor M which is rotated in forward and backward directions can be selectively transmitted to the document feeder 3 and to the image scanner 2.

Further, as shown in FIG. 5, when the P-Gear 46 is located on the side of the image scanner 2, the projection 421 of the link plate 42 comes into contact with the projection 474 of the stopper 471 at a contact point P2 on the side portion 474a of the projection 474. On the other hand, when the P-Gear 46 is located on the side of the document feeder 3, the projection 421 comes into contact with the projection 474 at a contact point P3 on the side portion 474b of the projection 474. The contact points P2 and P3 and the pivot point P1 (471a) of the stopper 471 substantially lie on the same phantom line (dash and double dotted line in FIG. 5).

Accordingly, by controlling the ON/OF state of the solenoid 473, an engaging operation of the projections 421 of the link plate 42 with the projection 474 of the stopper 471 can be easily performed in terms of mechanical construction.

The contact points P2 and P3 can, however, be set arbitrarily. In other words, the arrangement of the stopper 471 constituting the displacement restricting mechanism 47 and a drive mechanism for actuating the stopper 471 (corresponding to the solenoid 473 in this embodiment) is not limited to the above shown in the embodiment, and any alteration can be made therein without departing from the spirit of the invention.

In the above embodiment, the NP-Gear 43 is non-pivotable (or first) drive transmission means that rotates upon receiving a driving force of the motor M, and the P-Gear 46 is pivotable (or second) drive transmission means for selectively transmitting the driving force of the motor M via the non-pivotable drive transmission means to the image scanner 2 and to the document feeder 3. However, such drive transmission means is not limited to a gear mechanism, and any mechanism can be applicable as far as it can transmit a driving force of the motor M to the image scanner 2 and to the document feeder 3.

In the aforementioned embodiment, described is the case where the drive switching mechanism according to this invention is incorporated in an image forming apparatus which is a complex machine having a combined function as image input apparatus of reading an original image, as copying machine of copying the read original image on a copy sheet, and as facsimile machine. However, the present invention is applicable to any image input apparatus comprising a document feeder for feeding original documents and an image scanner for reading the image of the original documents to enable feed/scan operation and scan/read operation by selectively transmitting a driving force of a forward and backward rotatable motor to the document feeder and to the image scanner.

Although the present invention has been fully described by way of example with reference to the accompanying drawings, it is to be understood that various changes and modifications will be apparent to those skilled in the art. Therefore, unless otherwise such change and modifications depart from the scope of the invention, they should be construed as being included therein.

What is claimed is:

1. A drive switching mechanism for use in an image input apparatus having a motor rotatable in a forward direction and a reverse direction, a document feeder for feeding an original document upon receiving a driving force of the motor, and an image scanner for scanning an image of the original document upon receiving the driving force of the motor, the mechanism comprising:

link means pivotal about a first axis;

first drive transmission means rotatably mounted on the link means for rotation about the first axis upon receiving the driving force of the motor;

second drive transmission means rotatably mounted on the link means for rotation about a second axis in association with the rotation of the first drive transmission means;

load supplier means interposed between the second drive transmission means and the link means for exerting a resistance force between the link means and the second drive transmission means to swing the link means together with the second drive transmission means around the first axis in a direction following the rotation of the motor so that the second drive transmission means is selectively set on the document feeder side or the image scanner side; and displacement restricting means for restricting the displacement of the second drive transmission means toward the image scanner during supply of the driving force of the motor to the document feeder via the first drive transmission means and the second drive transmission means when the second drive transmission means is set on the side of the document feeder, and for restricting the displacement of the second drive transmission means toward the document feeder during supply of the driving force of the motor to the image scanner via the first drive transmission means and the second drive transmission means when the second drive transmission means is set on the side of the image scanner.

2. The drive switching mechanism according to claim 1, wherein the displacement restricting means includes:

a stopper having one end thereof pivotally supported about a third axis between a restrict position and a release position and the opposite side thereof formed in such a shape as to engage the link means when set at the restrict position to restrict the displacement of the second drive transmission means; and a driver for pivotally moving the stopper between the restrict position and the release position to enable the pivotal movement of the second drive transmission means between the image scanner and the document feeder.

3. The drive switching mechanism according to claim 2, wherein the second drive transmission means includes a second gear, the document feeder including a drive gear engageable with the second gear to directly receive the driving force of the motor from the second gear in feeding the original document, the restrict position of the stopper bring set to define a clearance between the stopper and the link means, the clearance being set so as to maintain the engaging state of the second gear with the drive gear when the second gear is most shifted toward the image scanner within the clearance.

4. The drive switching mechanism according to claim 2, wherein the second drive transmission means includes a second gear, the image scanner including a drive gear engageable with the second gear to directly receive the driving force of the motor from the second gear in scanning the original image, the restrict position of the stopper being set to define a clearance between the stopper and the link means, the clearance being set so as to maintain the engaging state of the second gear with the drive gear when the second gear is most shifted toward the document feeder within the clearance.

5. The drive switching mechanism according to claim 2, wherein the stopper comes into contact with the link means at a first contact part when the second drive transmission means is set on the side of the document feeder, the stopper coming into contact with the link mens at a second contact part when the second drive transmission means is set on the side of the image scanner, the third axis along with the first and second contact parts being substantially aligned on a straight line.

6. Apparatus having a drive switch mechanism comprising:
   a support structure;
   a motor rotatable mounted on the support structure for rotary movement in a forward and a reverse direction;
   a first operable device operable to receive the driving force of said motor;
   a second operable device operable to receive the driving force of said motor;
   a link member pivotable mounted on said support structure for pivotable movement about a pivot axis;
   a first drive transmission element rotatably mounted on said link member for rotation about a first axis which is coincident with said pivot axis, said first drive transmission element being driven by said drive motor;
   a second drive transmission element rotatably mounted on said link member for rotation about a second axis, said second drive transmission element being driven by said first drive transmission element;
   a load supplier interposed between the second drive transmission element and the link member exerting a resistance force between the second drive transmission element and the link member to effect pivoting of the link member together with the second drive transmission element around said pivot axis in a direction corresponding to the direction of rotation of the second drive transmission element so that the second drive transmission element is operable to engage and drive said first operable device or said second operable device depending on the rotational direction of the drive motor; and
   a restricting device for selectively restricting displacement of the second drive transmission element when said second drive transmission element drives said first operable device or for restricting displacement of the second drive transmission element when said second drive transmission element drives the second operable device.

7. Apparatus according to claim 6 wherein said link member has a plurality of operating positions when said second drive transmission element drives said first operable device, one of said plurality of positions providing a space between said link member and said restricting device.

8. Apparatus according to claim 7 wherein said space enables temporary movement of the second drive transmission element away from the first operable device due to any abrupt torque transmission between the second drive transmission element and the first operable device.

9. Apparatus according to claim 7 wherein another of said plurality of positions provide engagement between said link member and said restricting device to preclude further movement of said link member away from said first operable device.

10. Apparatus according to claim 9 wherein said restricting device is moveable between a restrict position and a release position, said restricting device being moved from its restrict position to its release position when said link member is in said one position and said space between said link member said restricting device is provided, whereby impairment of movement of the restricting device from its restrict position to its release position by said link member is precluded.

11. Apparatus according to claim 6 wherein said second drive transmission element comprises a first gear, said first operable device including a second gear driven by said first gear, said first and second gears having first and second pitch circles respectively, a first and second roller disposed juxtaposed to and axially aligned with said first and second gears respectively, said first and second rollers having diameters substantially equal to the diameter of the pitch circle for the first and second gears respectively, said first and second rollers being engageable with one another to limit the force of engagement between said first and second gears when said load supplier exerts said resistance force to effect pivoting of the link member and engagement of said first and second gears.

12. Apparatus according to claim 6 wherein said load supplier exerts a substantially constant resistance force between the second drive transmission element and the link member during operation of the apparatus.

13. Apparatus according to claim 6 wherein said resistance force is a frictional force.

14. Apparatus according to claim 6 wherein said second drive transmission element is a gear, said gear being axially spaced from said link member to define an interposed space, a biasing device biasingly urging axial separation between said gear and said link member, said biasing device having a substantially constant axial length during operation of the apparatus.

15. Apparatus according to claim 6 wherein said load supplier biases said second drive transmission element into an axial position against an abutment, said second drive transmission element being axially spaced from said link member when said second drive transmission member abuts said abutment, said abutment precluding any increase in said axial spacing between said second drive transmission element and said link member during operation of the apparatus.

16. Apparatus according to claim 6 wherein said link member mounts a shaft having a shaft axis coincident with said second axis, said second drive transmission element being rotatably mounted on said shaft, said load supplier including a biasing device disposed about said shaft between said second transmission drive element and said link member.

17. Apparatus according to claim 6 wherein said restricting device includes a stopper moveable between a restrict position and a release position, said stopper having one part engageable with said link member when said stopper is in said restrict position and said second drive transmission member drives said first operable device, said stopper having another part engageable with said link member when said stopper is in said restrict position and said second drive transmission element drives said second operable device.

18. Apparatus according to claim 17 wherein said stopper is pivotal about a stopper axis between said restrict and said release positions, said stopper axis along with said one and said another engageable parts of said stopper being substantially linearly aligned.

19. Apparatus having a drive switch mechanism comprising:
   a support structure;

a motor rotatable mounted on the support structure for rotary movement in a forward and a reverse direction;

at least one operable device operable to receive the driving force of said motor;

a link member pivotable mounted on said support structure for pivotable movement about a pivot axis;

a first drive transmission element rotatably mounted on said link member for rotation about a first axis which is coincident with said pivot axis, said first drive transmission element being driven by said drive motor;

a second drive transmission element rotatably mounted on said link member for rotation about a second axis, said second drive transmission element being driven by said first drive transmission element;

a load supplier interposed between the second drive transmission element and the link member exerting a resistance force between the second drive transmission element and the link member to effect pivoting of the link member together with the second drive transmission element around said pivot axis in a direction corresponding to the direction of rotation of the second drive transmission element so that the second drive transmission element is operable to drive said at least one operable device; and a restricting device for selectively restricting displacement of the second drive transmission element when said second drive transmission element drives said at least one operable device.

20. Apparatus according to claim 19 wherein said link member has a plurality of operating position when said second drive transmission element engages and drives said at least one operable device, one of said plurality of positions providing a space between said link member and said restricting device, another of said plurality of positions providing engagement between said link member and said restricting device to preclude further movement of said link member away from said at least one operable device, said restricting device being moveable between a restrict position and a release position, said restricting device being moved from its restrict position to its release position when said link member is in said one position and said space between said link member said restricting device is provided, whereby impairment of movement of the restricting device from its restrict position to its release position by said link member is precluded.

* * * * *